E. G. LA VOIE.
AEROPLANE CONTROL.
APPLICATION FILED OCT. 21, 1918.
1,303,568.
Patented May 13, 1919
2 SHEETS—SHEET 1.
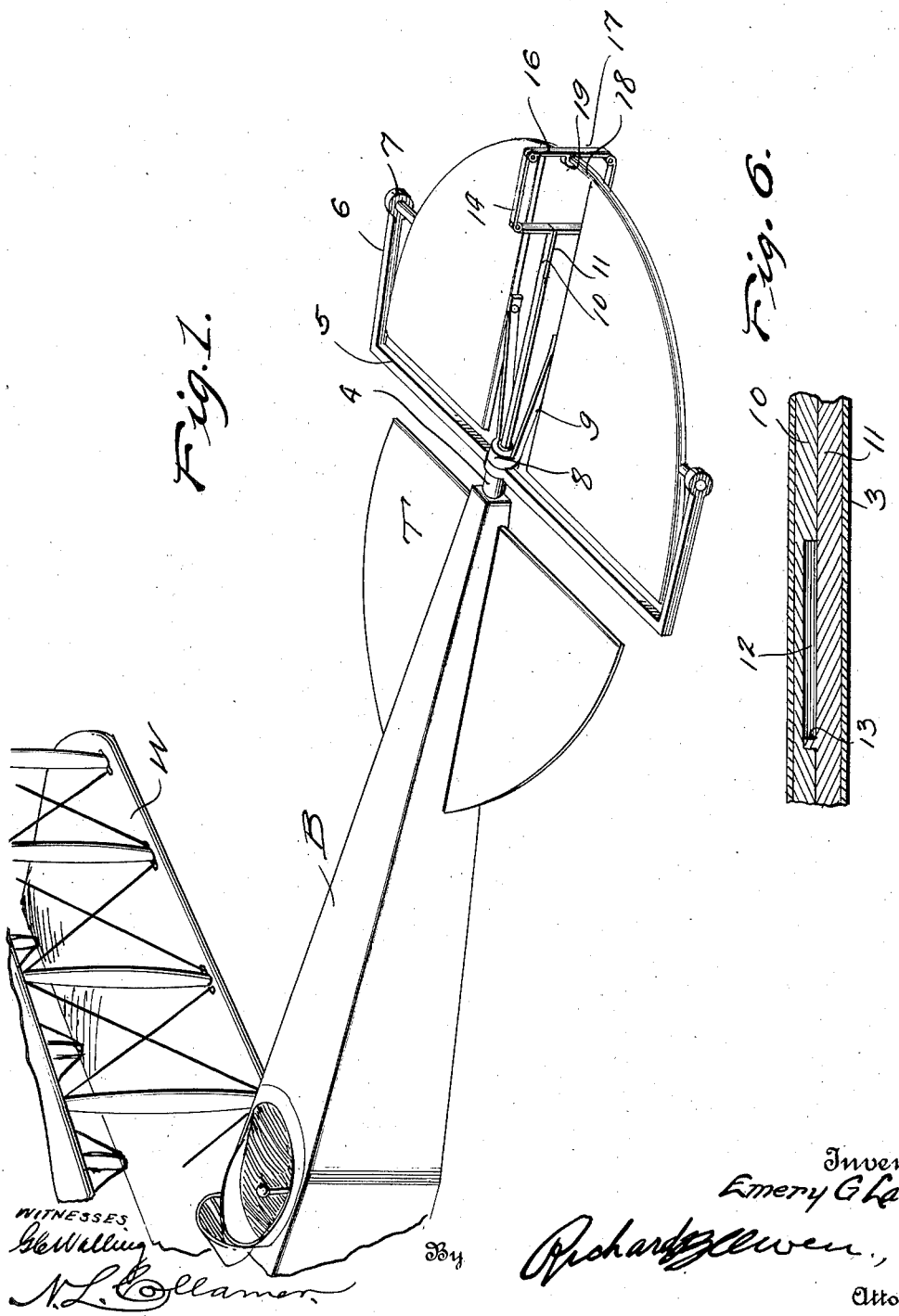

E. G. LA VOIE.
AEROPLANE CONTROL.
APPLICATION FILED OCT. 21, 1918.
1,303,568.
Patented May 13, 1919.
2 SHEETS—SHEET 2.
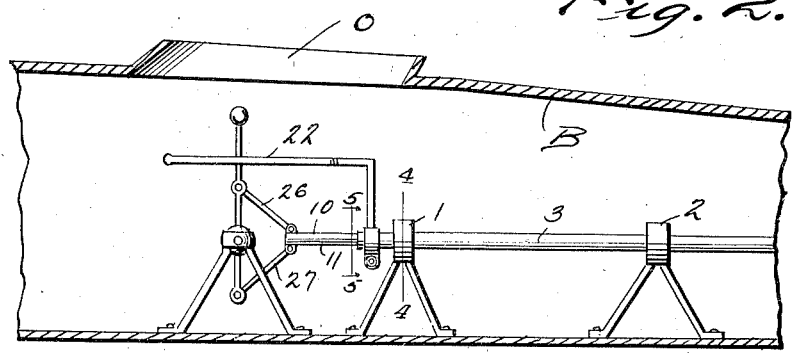
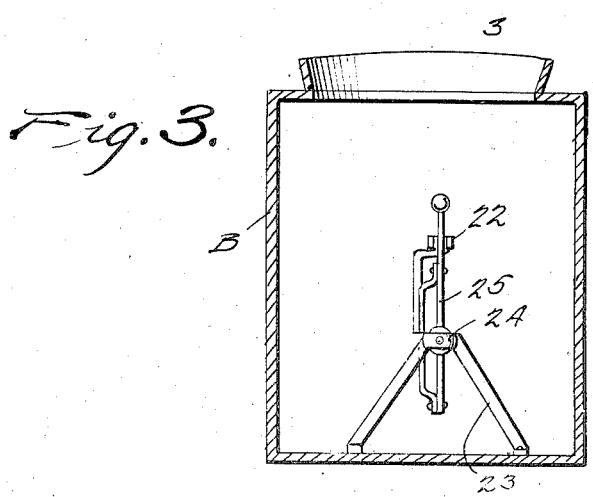
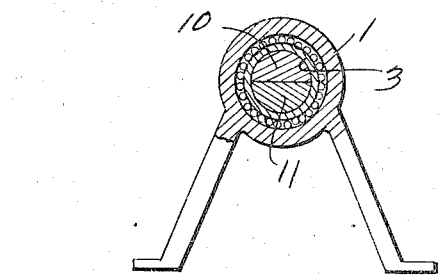
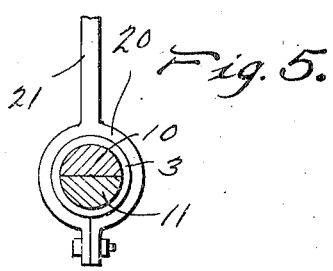
Inventor
Emery G La Voie
Attorney

UNITED STATES PATENT OFFICE.

EMERY G. LA VOIE, OF GREENWICH, CONNECTICUT.

AEROPLANE CONTROL.

1,303,568.  Specification of Letters Patent.  Patented May 13, 1919.

Application filed October 21, 1918. Serial No. 258,929.

*To all whom it may concern:*

Be it known that I, EMERY G. LA VOIE, a citizen of the United States, residing at Greenwich, in the county of Fairfield and State of Connecticut, have invented certain new and useful Improvements in Aeroplane Controls, of which the following is a specification.

This invention relates to aeronautics, and more especially to steering; and the object of the same is to produce improved means for manipulating the control tail.

I make this tail in two parts, and dispose between them the means for tilting them longitudinally, whereas the means for tilting the parts transversely is outside of the pieces or parts. The operating mechanism consists of a split shaft extended through a tube or sleeve and a peculiar lever mechanism for rocking the tube in its bearings or for reciprocating the parts of the split shaft. Details are set forth below and shown in the drawings, wherein—

Figure 1 is a perspective view of this improvement with so much of the standard portions of the machine as is necessary.

Fig. 2 is a longitudinal sectional view through the body of the machine showing the lever mechanism.

Fig. 3 is a cross section viewing the lever mechanism from the front.

Figs. 4 and 5 are enlarged sectional details on the lines 4—4 and 5—5 respectively of Fig. 2.

Fig. 6 is a longitudinal sectional detail through the tube and the split shaft.

The body B has the usual wings W at the front end and a fixed tail at its rear end lettered T, and the operator sits in the opening O.

The propeller mechanism is not shown as not being necessary to this case. In bearings 1 and 2 supported within the body is mounted a tube 3 whose rear end extends through a spacing collar 4 and is fixed at the center of a yoke 5, the arm 6 of which project rearwardly in parallelism and afford bearings 7 for the two parts of the tail yet to be described. Another collar 8 is fixed on the rear end of the tube 3 from which arms 9 extend rearwardly and diverge slightly to pivotally support the inner edges of the pieces of said tail. Thus when the tube is rocked in either direction, the entire yoke is rocked so that the two-part tail is tilted transversely.

Through the tube extends a split shaft consisting of upper and lower members 10 and 11, one having a slot 12 and the other a pin 13 movable therein to limit their relative adjustment. These parts of the split shaft extend completely through the tube and in rear of it, and they are connected by links 14 and 15 with arms 16 and 17 which respectively lead to and are pivotally connected with a point 19 at the rear of the frame 18 of said tail. Therefore, when one shaft is moved to the rear and the other to the front the rear edge of the two-part tail will be raised or lowered as it may be around its pivotal supports within the bearings 7 and the rear ends of the arms 9. It will be seen that this tail as a whole has two movements,—it may be rocked transversely by turning the tube and it may be rocked or tilted longitudinally by manipulating the parts of the split shaft.

The manipulating mechanism is best seen in Figs. 2, 3 and 5. Fast on the tube 3 is a clip 20 from which rises a finger 21, carried thence forward in a fork 22. A bracket 23 supports a globular socket 24 in which is mounted a ball (not seen) at the center of a lever 25 which stands forward of the front end of the tube and to the right thereof; and the fork 22 embraces this lever so that the latter may be moved back and forth therein. Above and below its ball-and-socket pivot or support, the lever is connected by links 26 and 27 with the upper and lower parts 10 and 11 of the split shaft respectively. Thus when the lever is moved back and forward in a vertical plane, the parts of the split shaft are oppositely reciprocated. If, however, the lever is rocked transversely on its ball-and-socket joint, the tube 3 and both parts of the split shaft are rocked laterally, with the result that the tail is tilted transversely so that one part goes up and the other part goes down. It is not impossible that both movements may be given to the tail for controlling the direction of the machine. The pin-and-slot connection between the parts of the shaft shown in Fig. 5 is employed for the purpose of preventing a too great relative movement thereof.

It is quite possible to set the wings or parts of the tail almost vertical so that it will act as a brake.

Attention is invited to the fact that I use no ropes, cords, wires or pulleys, but the actuating mechanism is direct and positive. If the two-part tail be set substantially horizontal as shown in Fig. 1, it may be employed for causing the machine to ascend or descend or for tilting it slightly so that it may turn from side to side. It is quite possible, however, to set the tail vertical so that it may be employed for steering, leaving the fixed tail to take care of the horizontal stability of the machine. Or, it is quite possible that said tail T may have means of its own for moving it, and the mechanism described above be employed simply as a control.

The foregoing description and the drawings have reference to what may be considered the preferred, or approved form of my invention. It is to be understood that I may make such changes in construction and arrangement and combination of parts, materials, dimensions, et cetra, as may prove expedient and fall within the scope of the appended claims.

Having thus fully described my invention, what I claim as new and desire to secure by Letters Patent is:—

1. In an aeroplane control, the combination with a tubular shaft extending to the rear of the machine, a yoke whose center is connected with the shaft, a collar fast on the tubular shaft in rear of the yoke, arms leading from said collar rearward, and a two-part tail pivotally mounted between the last named arms and the arms of the yoke; of manually operable mechanisms for turning said shaft to tilt the tail transversely, a split shaft extending through the tubular shaft and with its parts linked to the rear of said tail, and means for moving said parts forward and rearward for tilting the tail longitudinally.

2. In an aeroplane control, the combination with a tubular shaft extending to the rear of the machine, a yoke whose center is connected with the shaft, and a tail pivotally mounted between the arms of said yoke; of manually operable mechanisms for turning said shaft to tilt the tail transversely, a split shaft extending through the tubular shaft and with its parts linked to the rear of said tail, and means for moving said parts forward and rearward for tilting the tail longitudinally.

3. In an aeroplane control, the combination with a tubular shaft extending to the rear of the machine, a yoke whose center is mounted thereon and whose arms extend to the rear, bearings in said arms, a collar fast on the tubular shaft in rear of the yoke, arms leading from said collar rearward, and a two-part tail pivotally mounted between the last named arms and the arms of the yoke; of manually operable means for turning said tubular shaft to tilt the tail transversely, and manually operable means independent of said first-named means for tilting the tail on its pivot to adjust its position longitudinally.

4. In an aeroplane control, the combination with a tubular shaft mounted in the body, a yoke at its rear end, and a tail mounted on pivots transversely of the body within said yoke; of a rod extending through said shaft, a lever pivotally mounted in line with the front end of the shaft, connections between it and the shaft for rocking the same in its bearing, and connections between the lever and rod for reciprocating the latter for the purpose set forth.

5. In an aeroplane control, the combination with a tubular shaft mounted in the body, a yoke at its rear end, and a tail mounted on pivots transversely of the body within said yoke; of a rod extending through said shaft, a lever pivotally mounted in line with the front of the shaft, a clip on the tube, a finger rising therefrom, a fork extending from the finger forward astride said lever, and a link connecting the lever with the front end of said rod, for the purpose set forth.

6. In an aeroplane control, the combination with a tail, and a yoke supporting said tail for lateral and longitudinal movement; of a tube mounted in bearings and connected to said yoke, a rod extending slidably through the tube and connected with the tail for tilting it longitudinally, a bracket having a socket, a lever pivotally mounted in said socket, a fork carried rigidly by the tube and passing astride said lever, and a link connecting the lever with said rod, all for the purpose set forth.

In testimony whereof I affix my signature in presence of two witnesses.

EMERY G. LA VOIE.

Witnesses:
FREDERICK H. ALLEN,
L. E. SAMPSON.